United States Patent [19]
Bron

[11] 4,428,397
[45] Jan. 31, 1984

[54] FLUID FLOW CONTROL DEVICE

[76] Inventor: Dan Bron, 36 Palmach Str., Haifa, Israel

[21] Appl. No.: 408,161

[22] Filed: Aug. 16, 1982

Related U.S. Application Data

[63] Continuation of Ser. No. 842,168, Oct. 14, 1977, abandoned.

[30] Foreign Application Priority Data

Oct. 27, 1976 [IL] Israel ..................................... 50771

[51] Int. Cl.³ .............................................. G05D 7/01
[52] U.S. Cl. .................................... 137/504; 137/501; 239/542
[58] Field of Search ................. 137/501, 504; 239/542

[56] References Cited
U.S. PATENT DOCUMENTS

| | | | |
|---|---|---|---|
| 172,163 | 1/1876 | Peebles | 137/501 |
| 611,519 | 9/1898 | Simmance | 137/501 |
| 2,192,042 | 2/1940 | Hoffman | 137/501 |
| 2,219,408 | 10/1940 | Benz . | |
| 2,909,191 | 10/1959 | Horton | 137/501 |
| 2,916,047 | 12/1959 | Butcher | 137/501 |
| 2,938,538 | 5/1960 | Allen | 137/504 |
| 3,357,448 | 12/1967 | Martin | 137/501 |
| 3,807,430 | 4/1974 | Keller | 137/504 |
| 3,812,876 | 5/1974 | Krieter | 137/501 |
| 3,886,968 | 6/1975 | Murrell | 137/501 |

FOREIGN PATENT DOCUMENTS

| | | | |
|---|---|---|---|
| 43579 | 1/1974 | Australia | 137/501 |
| 479090 | 3/1976 | U.S.S.R. | 137/501 |

*Primary Examiner*—Robert G. Nilson
*Attorney, Agent, or Firm*—Lane, Aitken & Kananen

[57] ABSTRACT

There is provided a fluid flow-rate control device comprising a housing, an elastic stretchable membrane dividing the interior of said housing into a first and a second chamber; an inlet port of said housing leading to a fluid source and communicating with said first chamber; and an outlet port of said housing communicating with said second chamber; wherein the first and second chambers are in fluid communication via at least one passageway the dimensions of which remain unchanged during operation, and said membrane is fixedly held and positioned between said chambers so that when said membrane is exposed to a fluid pressure differential, it is adapted to be stretched and a portion thereof to move, solely by virtue of its elasticity, between positions closer to said outlet port to restrict the rate of flow therethrough, and positions further away from said outlet port to increase the rate of fluid flow therethrough, whereby the flow of fluid through said outlet port is controlled at a constant rate by said membrane, despite variations in the fluid pressure at, at least, one of the ports.

4 Claims, 5 Drawing Figures

U.S. Patent    Jan. 31, 1984    4,428,397
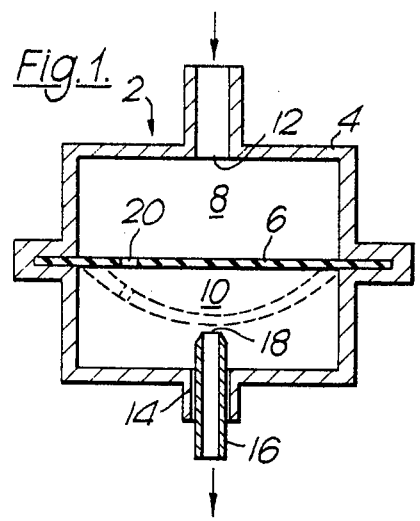
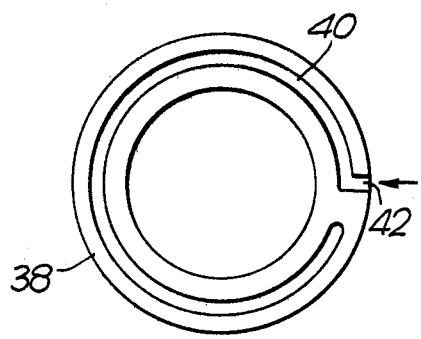
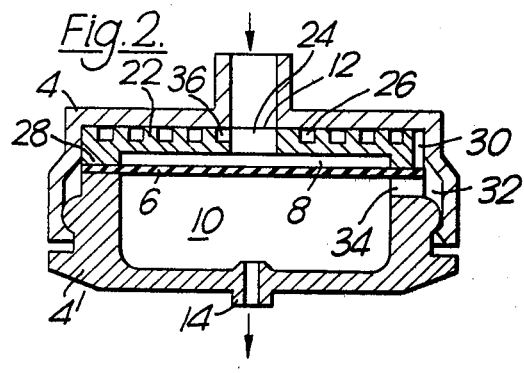
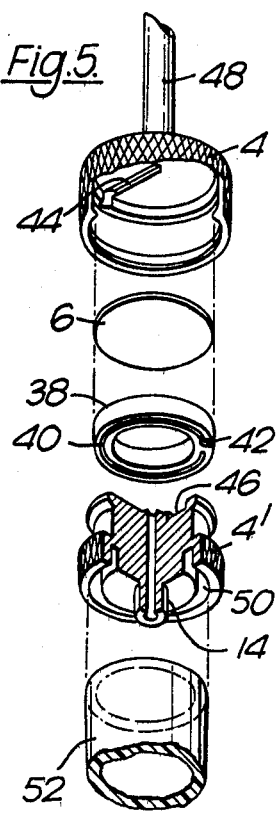
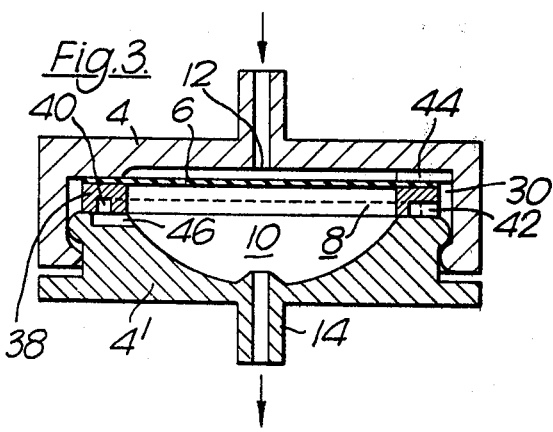

FLUID FLOW CONTROL DEVICE

This application is a continuation, of application Ser. No. 842,168, filed Oct. 14, 1977, now abandoned.

The present invention relates to a fluid flow control device and more particularly to a fluid flow-rate control device adapted to be connected to a source of fluid under pressure and to provide an output flow of fluid at a controlled constant rate despite variations in the fluid pressure at the source or at the fluid line downstream of the device.

Various types of constant flow regulators are known in the art. For example U.S. Pat. No. 3,357,448 discloses, a valve consisting of a casing having inlet and outlet ports, an apertured plate forming an orifice fixed across the outlet port and a diaphragm mounted in the casing and separating the inlet and outlet ports. The diaphragm carries a block with a central cone adapted to cooperate with the orifice to limit the flow therethrough.

Upon the movement of the diaphragm the block acts against the force of a spring biasing said block away from the orifice to vary the effective area of the orifice as a result of the position assumed by said cone. Between said diaphragm and the inlet port there is provided an apertured retaining plate. Thus as it can be gathered, the control of the fluid flow in a given device is regulated by the properties of the spring which functions to bias the block away from the apertured plate of the outlet port.

Another similar type of a flow regulator is shown in U.S. Pat. No. 3,886,968 which has a diaphragm means mounted in a casing having an inlet and outlet port, said diaphragm means including a flexible outer portion and a thickened central portion adapted to move against the force of a coiled compression spring which is interposed between said thickened portion and the casing portion surrounding the outlet port.

Here again, the diaphragm is merely adapted to divide the interior of the casing into two chambers and to allow the thickened portion thereof to move in relation to the outlet port against the force of a spring which biases said thickened portion away from the outlet port.

In contradistinction to these prior art devices the present invention provides a fluid flow-rate control device comprising:

a housing;

an elastic stretchable membrane dividing the interior of said housing into a first and a second chamber;

an inlet port of said housing leading to a fluid source and communicating with said first chamber; and an outlet port of said housing communicating with said second chamber; wherein said first and second chambers are in fluid communication via at least one passageway the dimensions of which remain unchanged during operation and said membrane is fixedly held and positioned between said chambers so that when said membrane is exposed to a fluid pressure differential, it is adapted to be stretched and a portion thereof to move, solely by virtue of its elasticity, between positions closer to said outlet port to restrict the rate of flow therethrough, and positions further away from said outlet port to increase the rate of fluid flow therethrough, whereby the flow of fluid through said outlet port is controlled at a constant rate by said membrane, despite variations in the fluid pressure at, at least, one of the ports.

Accordingly, as it can be recognized, the present invention utilizes the stretchability properties of a membrane, portions of which are adapted to move solely by virtue of the elasticity and stretchability of said membrane in relation to the outlet port to maintain the outlet flow at a constant rate despite variations in the fluid pressure at, at least one of its ports.

Thus, the fluid control device of the present invention represents an improvement over the known prior art devices in its simplicity of construction by avoiding the necessity of utilizing a multiplicity of specially designed shaped valve ports as well as eliminating the need for the intricate assembly of such ports. Furthermore, the dependence of the control of the fluid flow solely on the properties of an elastic membrane provides a more sensitive control device and avoides such adverse effects as hysteresis of a spring which spring has been used in the prior art devices to act as the reference element.

While the invention will now be described in connection with certain preferred embodiments, it will be understood that it is not intended to limit the invention to these particular embodiments. On the contrary, it is intended to cover all alternatives, modifications and equivalent arrangements as may be included within the scope of the invention as defined by the appended claims. Nevertheless it is believed that embodiments of the invention will be more fully understood from a consideration of the following illustrative description read in conjunction with the accompanying drawings, in which:

FIG. 1 is a cross-sectional view of a flow-rate control device according to the present invention;

FIG. 2 is a cross-sectional view of another embodiment of a flow control device according to the present invention;

FIG. 3 is a cross-sectional view of still a further embodiment of a device according to the invention;

FIG. 4 is a plane view of the flow restricting means shown in cross-section in FIG. 3; and FIG. 5 is an exploded isometric view of a regulated flow-rate infusion device similar to the device of FIG. 3.

In FIG. 1 there is shown a fluid flow control device 2 including a circular or cylindrical housing 4 the interior of which is divided by means of an elastic stretchable disc shaped membrane 6, e.g. a rubber membrane, into a first chamber 8 and a second chamber 10. The first chamber 8 communicates with an inlet port 12 and the second chamber 10 communicates with an outlet port 14. Advantageously, the outlet port 14 is optionally provided with a tubular fitting 16 slidably or threadably engaging said outlet port thereby facilitating the adjustment of the distance of the outlet opening 18 of the fitting from the membrane 6, when in rest position. A throughgoing passageway 20 is made in the membrane 6 at a location displaced from a line passing through the inlet and outlet ports.

In operation, as fluid under pressure enters the inlet port 12, it will flow into chamber 8 and via passageway 20 into chamber 10 and out through the outlet opening 18. As long as the rate of fluid flow is less than a predetermined desired value, the membrane 6 will not be stretched at all or will be only very slightly stretched in the direction of the outlet port. When the flow in the inlet port increases and approaches a desired value as determined by the parameter of the device, a pressure differential, on both sides of the membrane between the first inlet chamber and the second outlet chamber, is established in accordance with the pressure drop which is caused when the fluid passes through the passageway 20. The dimensions of the passageway remain constant and unchanged during operation. This force differential causes the membrane to further stretch in the direction of the outlet port until, at a predetermined input flow-rate, a portion of the membrane reaches the vicinity of the outlet opening and restricts the same thus preventing further increase in the flow-rate therethrough. The elastic strength of the membrane and its distance from the outlet opening determine the pressure differential thereon and a given size of a passageway, determines the fluid flow-rate therethrough. Conversely, by employing in a control device of fixed parameters membranes having different elastic properties, it is possible to obtain different values of the rate of the output flow. Hence, when it is desired to vary the flow-rate of the device of FIG. 1, the tubular fitting 16 is axially displaced to reposition opening 18 in relation to the membrane 6. This repositioning of the opening 18 changes the required pressure differential which is necessary to stretch the membrane to the newly displaced position of the opening and consequently, also correspondingly changes the rate of the output flow.

In FIG. 2 there is illustrated a constant fluid flow control device especially adapted for small discharge flow rates. The device comprises two interlocking housing parts 4 and 4', an inlet port 12 made in the housing part 4 and an outlet port 14 made in the housing part 4'. The device also includes a flow restricting member 22 for permitting a controlled drip or trickle flow therethrough. Member 22 is held against the inner surface of the housing part 4 and is provided with an opening 24 at its middle portion and a spirally extending channel 26 on its upper surface. The member 22 is further provided with a short peripheral flange 28 adapted to cooperate with the upper edge of the housing part 4' for holding therebetween the peripheral edge of the membrane 6. Instead of the passageway made in the membrane 6 itself, as in the embodiment of FIG. 1, according to this embodiment the passageway providing a communication path between the chambers 8 and 10 is formed in and by the walls of the housing ports around the membrane. The passageway consists of a first section 30 extending between a lateral edge of the member 22 and the inner wall of housing part 4, a second section 32 consisting of a peripheral cavity formed by said housing part and of a third section 34 extending between the housing part 4' and a surface of the membrane.

The fluid entering the inlet port 12 passes through the opening 24 and impinges on the membrane 6. Thereafter the fluid enters the flow restricting channel 26 at 36, flows along the channel to exit the latter at passageway section 30 and continues therefrom via passageway sections 32 and 34 into chamber 10. Depending on the fluid pressure differential which is thus established on both sides of the membrane, the latter will stretch in the direction of the outlet port 14 to restrict the flow therethrough thus operating the device in a manner similar to that described hereinbefore with reference to the device of FIG. 1.

It whould be noted that instead of providing the flow restricting channel 26 on the upper surface of member 22, such a restricting channel can just as well be provided on the bottom surface of the member or in a protruding peripheral portion of the housing part 4, in which cases the channel will be covered by the upper surface of only a portion of the membrane 6. Similar restricting channel arrangements may, of course, be formed in the housing part 4'. Also, a restricting channel can be formed in the walls of the housing and may be constituted by a labyrinth-like path as known per-se in the art.

Turning now to FIGS. 3 and 4, there is shown an adjustable fluid flow-rate control device having a ring-like fluid flow restricting member 38. As best seen in FIG. 4, on one side of the member 38 there is made a channel 40 having an inlet 42 extending to the periphery of the member while the other end of the channel terminates short of said inlet 42. The member 38 is held between the bottom part of the housing and the membrane 6 which, in turn, is peripherally engaged by the upper part of the housing.

The fluid entering the inlet port 12 into chamber 8 can pass through a first section 44 of the passageway extending in the wall of the upper part of the housing 4 and therefrom around the membrane 6 into a second section 30 of the passageway. Section 30 communicates with the inlet 42 of the member 38, thus the fluid entering said inlet circulates in the channel 40 and is adapted to exit therefrom at the third passageway section 46 made in the housing part 4' which latter section leads to chamber 10. Naturally, the member 38 may also be positioned with its channel 40 facing the housing part 4', in which case the passageway section 46 will be formed in the housing part 4. As the housing part 4' is adapted to be axially rotated in respect to housing part 4 and with respect to the member 38, the passageway section 46 may be rotatatly aligned with any point along the channel 40. This alignment establishes the effective length of the restricting channel or in other words, establishes the effective resistance to the fluid flow through the passageway. As the effective length of the restrictive channel is decreased, the resistance to flow decreases and an initial preset regulation of the flow is achieved by the adjustment of the resistance of the passageway to the flow of fluid, whereafter the flow rate is controlled at a constant rate by said membrane.

In FIG. 5 there is illustrated in an exploded view, a flow-rate regulating device similar to the device of FIG. 3 but especially adapted for use as a regulated flow-rate infusion device. The various structural parts corresponding to the parts shown in FIGS. 3 and 4 are therefor marked with the same numerals. As seen in the figure, to the housing part 4 there is integrally affixed, a connecting tube 48 while the housing part 4' is provided with an annular groove 50 which is adapted to hold a transparent drip chamber 52 (only a section of which is shown), inserted therein.

As explained hereinbefore, by rotating housing part 4' with respect to housing part 4, the passageway section 46 is positioned along the restricting channel 40 to thereby determine the effective length of the channel through which the fluid must pass from the inlet 42 to communicate with the chamber 10. When the inlet 42 is aligned with the passageway section 46, the restricting channel is by-passed and there is established a direct flow through said passageway.

While particular embodiments of the invention have been described and shown with reference to the figures it will be evident to those skilled in the art that the present invention may be embodied in other specific forms without departing from the essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed is:

1. A fluid flow-rate control device comprising:

a housing having two interlocking parts;

an elastic stretchable membrane clamped along its periphery, inside the housing, between the two interlocking parts, said membrane dividing the interior of said housing into a first chamber and a second chamber;

an inlet port of said housing leading from a fluid source and communicating solely with said first chamber; and an outlet port of said housing communicating with said second chamber;

wherein said first and second chambers are in fluid communication via at least one passageway extending in part beyond the periphery of the membrane and along an inner surface of at least one of the parts of the housing and leading from said first chamber to said second chamber, said passageway communicating solely with the first and second chambers and including at least one portion comprising a spirally extending channel in which flow is relatively restricted, the dimensions of the passageway remain unchanged during operation, and said membrane is fixedly held and positioned between said chambers so that when said membrane is exposed to a fluid pressure differential, it is stretched and a portion thereof is moved, solely by virtue of its elasticity, between positions closer to said outlet port to cause said portion of said membrane to restrict the rate of flow through said outlet port, and positions farther away from said outlet port to cause said portion of said membrane to increase the rate of fluid flow through said outlet port, whereby the flow of fluid through said outlet port is controlled at a constant rate by said membrane, despite variations in the fluid pressure at, at least, one of the ports.

2. The device as claimed in claim 1 wherein a first of the two interlocking housing parts includes the inlet port and the second of the two interlocking housing parts includes the outlet port.

3. The device as claimed in claim 2 wherein said housing parts are adapted to be rotated with respect to each other.

4. The device as claimed in claim 1 wherein said spirally shaped channel is defined in a member dismountably affixed in the housing.

* * * * *